United States Patent [19]

Goncalves

[11] Patent Number: 4,722,459

[45] Date of Patent: Feb. 2, 1988

[54] DEVICE FOR DISPENSING AT LEAST ONE VISCOUS PRODUCT IN DOSED QUANTITIES

[75] Inventor: Antonin L. Goncalves, Groslay, France

[73] Assignee: "L'Oreal", Paris, France

[21] Appl. No.: 894,115

[22] Filed: Aug. 7, 1986

[30] Foreign Application Priority Data

Aug. 13, 1985 [FR] France ................. 85 12333

[51] Int. Cl.⁴ .............. B67D 5/52; B65D 47/18; A46B 11/42

[52] U.S. Cl. ............... 222/135; 222/209; 222/340; 222/373; 222/385; 222/401; 222/420; 222/484; 222/546; 222/631; 417/490; 401/262; 401/188 R

[58] Field of Search ............... 222/108, 109, 111, 135, 222/137, 151, 209, 340, 373, 385, 394, 401, 402, 420, 422, 484, 496, 546, 631; 401/262, 188 R, 188 A, 187, 190, 276; 239/333, 331; 417/490, 497; 141/115, 117; 604/146, 207, 181, 186, 295, 298, 191, 296

[56] References Cited

U.S. PATENT DOCUMENTS

| | | | |
|---|---|---|---|
| 1,686,188 | 10/1928 | Tipton | 222/484 X |
| 2,281,051 | 4/1942 | Roger | 222/340 |
| 2,327,285 | 8/1943 | Opitz | 222/401 X |
| 2,787,249 | 4/1957 | Barlow et al. | 401/188 A X |
| 2,826,218 | 3/1958 | Barlow et al. | 222/484 X |
| 3,133,310 | 5/1964 | Yorker et al. | 222/151 X |
| 3,246,657 | 4/1966 | Roller, Sr. | 401/187 X |
| 3,468,612 | 9/1969 | Aston | 401/188 R |
| 3,640,470 | 2/1972 | Susuki et al. | 239/333 |
| 3,908,870 | 9/1975 | Nozawa et al. | 222/385 X |
| 3,930,599 | 1/1976 | Brothers et al. | 222/546 X |
| 4,040,420 | 8/1977 | Speer | 604/82 |
| 4,260,077 | 4/1981 | Schroeder | 222/137 |
| 4,261,481 | 4/1981 | Speer | 222/135 |

FOREIGN PATENT DOCUMENTS

| | | |
|---|---|---|
| 112732 | 12/1898 | Fed. Rep. of Germany . |
| 1289874 | 11/1961 | France . |
| 80720 | 4/1963 | France . |
| 2541244 | of 1984 | France . |
| 253356 | 11/1948 | Switzerland . |

Primary Examiner—Joseph J. Rolla
Assistant Examiner—Gregory L. Huson
Attorney, Agent, or Firm—Cushman, Darby & Cushman

[57] ABSTRACT

The dispenser device in accordance with the invention comprises a tubular barrel filled with the product, a nose having a dispenser orifice, possibly closed by a detachable cap, a plunger and a pump assembly for pressurizing the product to be dispensed. This assembly comprises an obturator valve applied against a seat by a stem of the plunger which is biased by a spring. A skirt of the plunger slides in a socket of the barrel in a leakproof manner only over a portion of its stroke. The depression of the plunger actuates the opening of the valve and the pressurization of a quantity of air under the skirt. Air pressure is exerted on the product to cause it to emerge from the orifice.

25 Claims, 8 Drawing Figures

DEVICE FOR DISPENSING AT LEAST ONE VISCOUS PRODUCT IN DOSED QUANTITIES

FIELD OF THE INVENTION

The present invention relates to a device for dispensing at least one relatively viscous product, in particular a cosmetic product, in dosed quantities; the invention relates more particularly to a device of the "dosing stylo" type for dispensing this product drop by drop or for dispensing two products to be mixed for a particular treatment, simultaneously and drop by drop.

PRIOR ART

Dosing stylos are already used, particularly in the perfumery and cosmetics industries for drop-wise dispensing of creams, toilet lotions or gels which are relatively oily, intended for body care.

These known dosing stylos comprise a tubular barrel delimiting a chamber for the product intended to contain a charge of a product to be dispensed; the barrel is extended at a first end in a nose whose end has a dispenser orifice with a small diameter; this nose can be covered by a detachable leak proof cap obturating the dispenser orifice; the barrel also contains pressurising means which are actuated by a plunger accessible from outside the barrel and which are intended to cause a pressurised quantity of air to enter into the product chamber so as to eject a dosed quantity of the product through the dispenser orifice of the nose when the cap is withdrawn and when the plunger is depressed towards the barrel interior from an initial position; this depression of the plunger is against a biasing spring which tends to push the plunger towards the outside of the barrel into its initial position and to enable the pressurising means to ensure a leakproof closure of the product chamber on the side of the second end of the tubular barrel.

OBJECTS OF THE INVENTION

Whereas in these known devices, which only allow a single product to be dispensed, the pressurising means form a two-stage pump and comprise a large number of different components, it is an object of the present invention to overcome this disadvantage.

It is a further object of the present invention to simplify, and reduce the cost of, the dispenser whereas the known dosing stylos have a complex structure and are therefore expensive to make and their scope of application is limited.

SUMMARY OF THE INVENTION

With the present invention, it is proposed on the one hand, to make a dosing stylo obtaining the same results in use as the known devices, but having a simplified structure and therefore lending itself to manufacture at a reasonable cost price much lower than those of the known devices of this type. Moreover, it is proposed to make a dosing stylo adapted to the simultaneous dispensing of several products which have to be kept separate from each other in the dispenser, and in particular a double dosing stylo for simultaneous and drop-wise dispensing of two products which can be mixed after dispensing, to carry out particular treatments.

The present invention provides a new industrial product constituted by a dosing stylo intended for dispensing at least one relatively viscous product in dosed quantities, in particular a cosmetic product, and of the type comprising a tubular barrel which delimits at least one product chamber intended to contain a charge of a product to be dispensed and which is extended at one first end by at least one nose whose end has at least one dispenser orifice of a small diameter, capable of being obturated in a leakproof manner by fixing a detachable stopper on the corresponding nose, the barrel also containing pressurising means which are actuated by a plunger accessible from outside the barrel and which are intended to cause a quantity of pressurised air to penetrate into each product chamber, so as to eject a dosed quantity of the corresponding product through the corresponding dispenser orifice of a nose when the stopper is withdrawn and when the plunger is depressed towards the barrel interior from an initial position and against at least one biasing spring, each biasing spring tending to push the plunger towards the outside of the barrel into its initial position and to allow the pressurising means to ensure a leakproof closure of each product chamber on the side of the second end of the barrel, and this device is characterised in that the pressurising means form a unit for each product comprising on the one hand, a valve whose movable obturator is connected to a piston accompanying the plunger in its displacements and which is applied in a leakproof manner against a valve seat surrounding a pressurisation orifice arranged in an internal partition of the barrel when the plunger is pushed into its initial position whilst the valve obturator is removed from its seat when the plunger is depressed towards the interior of the barrel; on the other hand, each set of the pressurising means comprises a detachable skirt joined to said piston accompanying the plunger in its displacements and delimiting, together with a tubular portion of the barrel, a variable volume pressurisation chamber, each pressurisation chamber having a maximum volume and communicating with the ambient atmosphere when the plunger occupies its initial position and each pressurisation chamber decreasing in volume and being isolated from the ambient atmosphere by the corresponding skirt coming into a sliding and leakproof contact against the corresponding tubular portion of the barrel when the plunger is depressed towards the barrel interior so that compressed air in each pressurisation chamber flows into the corresponding product chamber by passing through the corresponding pressurisation orifice.

In each set of the pressurising means, the linking in displacement of the obturator and of the piston is advantageously ensured in a reliable manner in that the obturator is fixedly connected to the piston by means of a stem extending into the barrel interior.

In a preferred embodiment, which is simple to make and to operate, each obturator is fixed to the corresponding piston by catch-engagement. In a first variant, each stem is integral with the corresponding piston and carries at its free end an enlarged and elastically deformable head which comes to be elastically engaged in a hole arranged in the corresponding obturator. However, in order to facilitate the assembly of the component of that one of the end portions of the dosing stylo comprising the push button, each stem is, in a second variant, integral with the corresponding obturator and is surrounded in its free end portion by at least one peripheral bead with which the stem is elastically catch-engaged in a corresponding groove formed in the lateral wall of a recess arranged in the corresponding piston and wherein the free end portion of the stem is engaged.

In order to ensure a reliable connection in displacement of each skirt with the corresponding piston, as well as proper compression of the air contained in the corresponding pressuriation chamber, and proper recharging of this chamber with air in the stroke of one up and down movement of the plunger in relation to the barrel, it is advantageous for the skirt to have a substantially frusto-conical shape and to be integral with the piston at one first end, whilst the second end of the skirt is free and slides along the corresponding tubular portion which has two guide portions disposed end to end and of which one has a larger transverse cross-section than the other, so that the free end of the skirt does not slide in a leakproof manner along one of the portions over a first part of the compression stroke of the plunger when it is depressed towards the barrel interior from its initial position, when the free end of the skirt slides in a leakproof manner along the other portion over the remaining compression stroke of the plunger.

Each substantially frusto-conical skirt may be a skirt converging towards its free end and sliding around the corresponding tubular portion of the barrel with which it delimits the corresponding pressurisation chamber. In that case, this tubular portion must be shaped as a socket inside the barrel and it may advantageously be carried by the corresponding internal partition, being adjacent to this partition at the guide portion with the larger transverse cross section. The free end of the skirt then comes into a sliding and leakproof contact with its internal and lateral face against the external face of this portion with the larger transverse cross section along the corresponding portion of the compression stroke of the plunger. The skirt is, in that case, guided outside the socket whereon the portion with the larger transverse cross-section is delimited between the portion with the smaller transverse cross-section and the internal partition.

However, in order to facilitate the making of the two portions of the tubular section, to improve the guidance of the skirt along this tubular section and above all, to improve the seal of the sliding contact of the free end of the skirt against one of the two portions of this tubular section, it is advantageous for each skirt to flare towards its free end and to slide inside the corresponding tubular section which has the configuration of a socket inside the barrel and is carried by the corresponding internal partition, being adjacent to this partition via the guide portion with the smaller transverse cross-section against the internal face whereof the external lateral face of the free end of the skirt comes into a sliding and leakproof contact over the corresponding portion of the compression stroke of the plunger. In that case, and in accordance with a simple form of embodiment, the portion with the larger transverse cross-section is delimited on each socket by at least one groove arranged on the internal face of the corresponding socket and extending only over one portion of the length of the socket.

Advantageously, each skirt is integral with the corresponding piston and each re-straining spring bears with one end against the corresponding internal partition, which makes it possible to reduce the number of pieces necessary for the making of the dosing stylo without substantially complicating the manufacture of these pieces or their assembly. Moreover, in the preferred case of an embodiment wherein each skirt flares towards its free end, the end of the corresponding restraining spring which bears against the corresponding internal partition can, moreover, be advantageously centred around a bead surrounding the corresponding pressurisation orifice and projects towards the inside of the corresponding pressurisation chamber and is carried by the internal partition.

Remaining within the framework of the preferred mode of embodiment, wherein each skirt flares towards its free end, the guidance of the corresponding piston, and therefore of the skirt, can be further improved if, advantageously, the piston comprises a lateral collar surrounding the skirt with a gap and delimiting with it an annular chamber with a closed bottom, wherein the corresponding internal socket is guided and accommodated when the plunger and the piston are completely depressed towards the barrel interior, the closed bottom coming to bear against the socket to limit the compression stroke of the piston whose lateral collar is itself guided and accommodated in another annular chamber delimited in the barrel around the internal socket.

In the various variants of the embodiment set out above, it is possible for the displacements of the plunger and/or of the obturator of each valve and/or of each skirt to be effected along a transverse direction in relation to the axis of the tubular barrel and in particular, perpendicular to this axis. In that case, it is clear that the tubular portion of the barrel which delimits the pressurisation chamber or chambers with the corresponding skirt or skirts also comprises an internal socket with a transverse axis in relation to the axis of the tubular barrel and is advantageously carried by an internal partition extending parallel to the axis of the tubular barrel.

However, to make it possible to choose the compression stroke of each piston, and hence the compression ratio in the corresponding pressurisation chamber, as well as the pressure and quantity of the pressurised air which is transferred into the corresponding product chamber on each manipulation of the push button in accordance with the viscosity of the product, without being constrained by the transverse dimensions of the tubular barrel, it is advantageous for the corresponding internal partition to be transverse and perpendicular to the axis of the tubular barrel and for the push button, the obturator and the corresponding skirt to be axially displaced in the barrel. In that case, in a preferred mode of embodiment, the skirt, the tubular portion of the barrel, the corresponding pressurisation chamber and opening and the corresponding obturator and valve seat, as well as, if applicable, the corresponding stem and/or the lateral collar of the corresponding piston and/or the bead of the corresponding partition are coaxial.

In order to prevent an untimely droplet formation in the region of the dispenser orifice of such dispensers because of certain conditions of use, and/or following certain manipulations of these dispensers, a pressure stabilizer is advantageously fitted in each nose for each dispenser orifice, this pressure stabilizer comprising a tubular component whereof an internal passage intended to be traversed by a dosed quantity of the product ejected from the corresponding product chamber towards the corresponding dispenser orifice is partly obturated by a transverse partition penetrated by a passage orifice with a smaller cross-section than the corresponding dispenser orifice.

In a particular embodiment, intended for dispensing a single product and whose barrel delimits a single product chamber and is extended in a single nose whose end has a single dispenser orifice, it is advantageous for the plunger simultaneously to form the piston of the pressurising means so as to simplify the structure and to reduce the number of components still further.

In this latter case, the pressure stabilizer may advantageously be such that the tubular component has two cylindrical bearings with different diameters joined by a frusto-conical portion, whose small base is formed by the transverse partition with the passage opening, the cylindrical bearing with the smaller cross-section being fitted in a portion adjacent to the large base of a substantially frusto-conical projection of the nose whose end is formed by the portion adjacent to the small base of this projection, and the tubular component of the pressure stabilizer is retained in position in the nose by elastic catch-engagement of its cylindrical bearing with the larger diameter.

When the dosing stylo only dispenses a single product, the stopper intended to obturate the dispenser orifice of the nose is preferably formed by the bottom of a detachable cap intended to cover the nose assembly.

Moreover, in order to facilitate the fitting of the nose on the barrel, the latter has advantageously, near its first end, an inwardly projecting peripheral step which is elastically catch-engaged in a peripheral groove arranged in the external face of a cylindrical and tubular centering bearing provided at one end of the nose and with which the nose is fitted, in the first end of the tubular barrel, until the said first end of the barrel comes to abut against an external peripheral shoulder of the nose.

Finally, in order reliably to prevent the product from escaping through the dispenser orifice between two uses of the dosing stylo, the detachable cap has advantageously on its bottom an inwardly directed projection of the cap penetrating at least partly into the end of the nose so as to obturate the dispenser orifice in a leak-proof manner when the cap is engaged and fixed on the nose by screwing a thread of the cap on to a thread of the nose until the cap comes to bear against the external peripheral shoulder of the nose. In order to centre the cap on the end of the nose and to guide the projection into a position obturating the dispenser orifice when the cap is fixed on the nose, the cap advantageously carries several internal and radial flanges distributed and interspaced around the tip.

Moreover, and still with the object of simplifying the manufacture, the skirt is joined to the plunger via a shoulder of the plunger, against which the single biasing spring bears, and is centered at one of its ends, and the centering bead of the other end of the spring is situated between the pressurisation orifice and the internal socket.

In order to facilitate the treatments, for instance, dermatological treatment requiring a simultaneous use of two different products which must be stored separately from each other and mixed extemporaneously, the invention also provides a double dispenser for the simultaneous and drop-wise dispensing of these two products and this dispenser is such that the tubular barrel has an axial internal partition delimiting in the barrel two adjacent product chambers separated from each other, each of which is intended to contain one charge of one of the two products to be dispensed, the barrel also containing two sets of pressurising means which are symmetrical in relation to the internal partition, the plunger being mounted so as to simultaneously push back the two pistons of these sets of pressurising means against one biasing spring for each one of the pistons, when the plunger is depressed towards the barrel interior. Thus, with each push on the plunger, one produces the simultaneous emergence of one drop of each of the two products of a different nature and possibly different colour, but which are complementary for a given treatment and which can be mixed directly on the skin.

In order to limit the transverse size of such a dispenser, each of the two re-straining springs is advantageously accommodated between the barrel and the tubular portion of the corresponding set of the pressurising means.

To allow the user to appreciate instantaneously and before use that such a dispenser is of the type dispensing two different products, the dispensers of this type may be such that their barrel is extended in two noses, each one of which has a single dispenser orifice and which are integral with a common end fitting fitted in the barrel so that each dispenser orifice can only dispense the product ejected from one of the two product chambers, the stopper obturating each dispenser orifice being formed by the bottom of a cap which is screwed on to the end of the corresponding nose.

But it remains possible for the barrel to be extended in a single nose which, in that case, is traversed by two ducts isolated from each other and each leading to one of two adjacent dispenser orifices in the end of the neck whereon there is screwed a single stopper obturating the two dispenser orifices, the nose comprising an end fitting wherewith it is fitted on to the barrel so that each of the two ducts of the neck should only communicate with one of the two product chambers delimited in the barrel.

BRIEF DESCRIPTION OF THE DRAWINGS

To render the object of the invention more readily understood, several embodiments represented in the attached drawings will now be described by way of illustrative examples.

In these drawings.

DESCRIPTION OF THE PREFERRED EMBODIMENTS

Figures 1, 2, 3, 4:
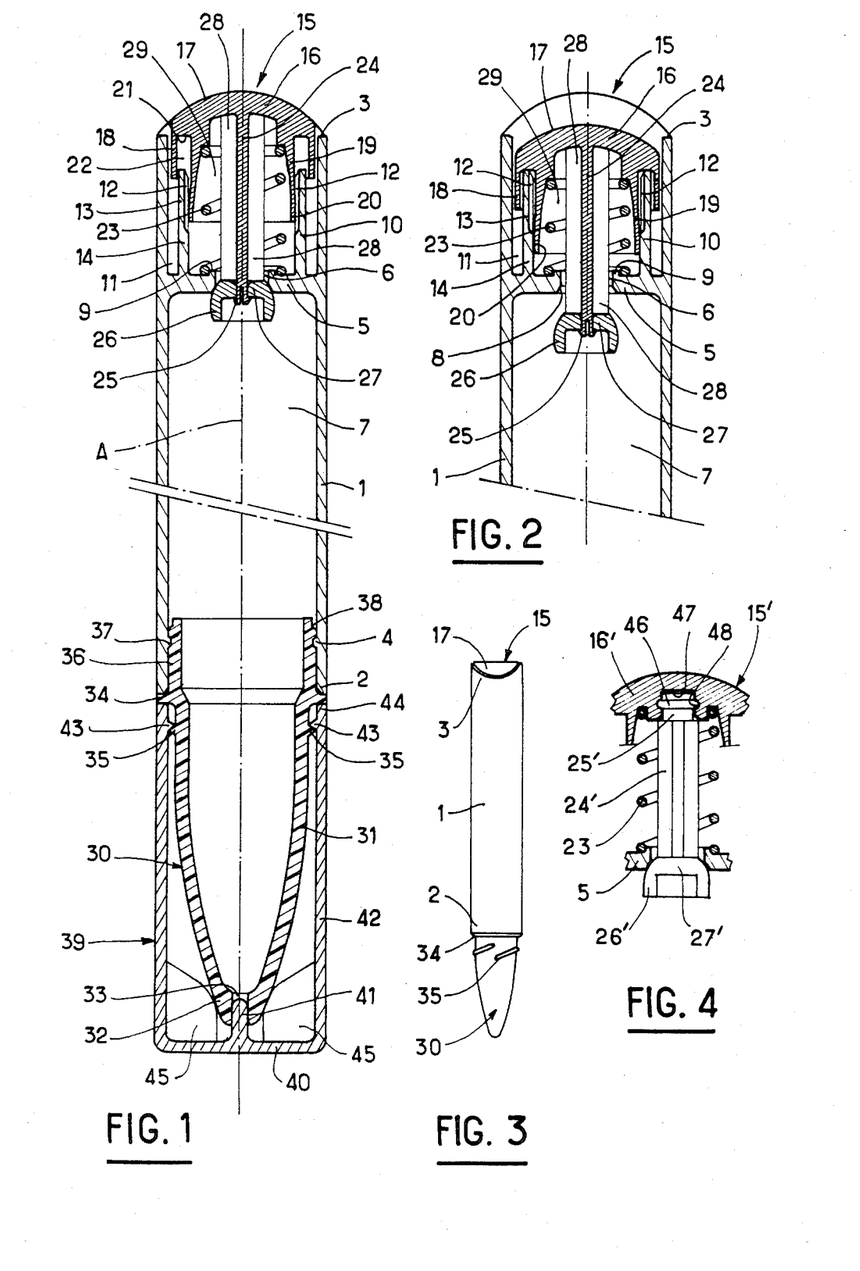
FIG. 1 is an axial cross-sectional view of a preferred embodiment of the dosing stylo in accordance with the invention for the dispensing of a single product, shown in its position of rest.
FIG. 2 is a partial axial cross-sectional view limited to the upper portion of the dosing stylo of FIG. 1 represented in its position of use when the plunger is depressed.
FIG. 3 is a schematic view in side elevation of the dosing stylo of FIGS. 1 and 2.
FIG. 4 is a partial axial cross-sectional view of a variant of the dosing stylo of FIGS. 1 to 3.

Referring to FIGS. 1 to 3, the dosing stylo comprises a tubular barrel 1, in the form of a cylindrical body of circular cross-section, whose lower end 2 (in the lower position on FIG. 1 and which is downwardly directed in the configuration of use, as explained below) delimits a circular opening in a plane perpendicular to the axis A of the barrel 1 whilst the upper end 3 has an edge curving towards the lower end 2 by two rounded portions which are substantially diametrically opposed (see FIG. 3). Near its lower end 2, which has an internal chamfer, the body 1 has an inwardly projecting annular step 4 of a trapezoidal cross-section, with the small base facing inwardly, joined to the internal face of the barrel 1 by two inclined sides. On the side of its upper end 3, the barrel 1 has an internal transverse partition 5 perpendicular to axis A of the barrel and wherein there is a central opening 6 of a circular cross-section and coaxial with the barrel 1. This opening 6 opens out into the chamber 7 delimited between the partition 5 and the lower end 2 via a frusto-conical recess 8 (see FIG. 2) spreading out towards the chamber 7. On the side of the upper end 3, the opening 6 is surrounded by a circular bead 9 coaxial with the barrel 1 carried by the partition 5 and projecting towards the upper end 3. At a certain distance around the bead 9, the partition 5 carries, also projecting towards the upper end 3, an internal cylindrical socket 10 with a circular cross-section coaxial with the barrel 1 and which does not extend axially as far as the upper end 3. This socket 10 delimits with the portion of the barrel 1 which it surrounds, an annular chamber 11 inside the barrel 1 and coaxial therewith. Axial grooves 12 all having the same length, which is smaller than the length (or height) of the socket 10, are arranged on the internal side of this socket 10 from its free end (turned towards the upper end 3) which has an internal chamfer, and these grooves 12 are regularly distributed in a circumferential direction over the periphery of the socket 10. These grooves thus delimit two portions on the socket 10 end to end, whereof one corresponding to the tubular portion of the socket 10 having the grooves 12, has an internal transverse cross-section which is larger than that of the other portion 14 delimited between the lower end (chamfered towards the partition 5) of the grooves 12 and of the partition 5.

The barrel 1, the step 4, the internal partition 5, the opening 6, the frusto-conical recess 8, the bead 9, and the internal socket 10 with the grooves 12, are integrally moulded of a plastic material.

In the opening delimited by the upper end 3 of the barrel 1, there is engaged a piston plunger 15. This plunger comprises a relatively thick and solid upper portion 16 which closes the upper opening of the barrel 1 with slight radial play, and whose top 17 has the same rounded and curved shape as that of the edge of the upper end 3 of barrel 1. This upper portion 16 is extended axially at its periphery in a lateral annular collar 18 with a circular cross-section extending towards the interior of the annular chamber 11. Inside the collar 18 and with a radial gap in relation to this collar 18, the portion 16 is also extended axially towards the partition 5 with a skirt 19 of a substantially frusto-conical shape, flaring towards its free lower end 20 and which extends axially over a greater distance than the axial dimension of the collar 18. At its upper end, which is thicker than the free end 20, the skirt 19 is, on the one hand, joined to the solid part 16 forming an annular bottom 21 for an annular chamber 22 delimited between this skirt 19 and the collar 18 and, on the other hand, forms an inner radial shoulder whereon there is centered and on which there bears the upper end of a helical spring 23 whose lower end bears against the partition 5 and is centered around the bead 9. The free lower end 20 of the skirt 19, in the form of a cylindrical barrel with a circular cross-section is elastically applied radially outwardly against the internal face of the socket 10. This is due to the fact that, by way of design, the external diameter of the free end of the skirt 19 is, when the plunger 15 is not engaged in the barrel 1, slightly larger than the internal diameter of the socket 10. In this way, when the plunger 15 is engaged in the barrel 1, the free end 20 of the skirt 19 is subjected to light and progressive elastic deformation and is radially compressed on passing into the internally chamferred upper end of the socket 10 when the collar 18 is engaged with its end in the annular chamber 11 with the radial clearances in relation to the barrel 1 as well as the socket 10. Finally, the central portion of the solid part 16 is extended axially into the barrel 1 in a central and axial stem 24 whose axial length is greater than that of the skirt 19. At its free lower end, this stem 24 has an enlarged head 25 with a frusto-conical external shape, converging on the opposite side to the plunger 15, and which is axially slit so that the two half heads thus formed may be elastically brought near to each other and then revert into their initial position by separating from each other. The plunger 15 is fixedly connected, by means of the stem 24 and the elastically deformable head 25, to a valve obturator 26 inserted into the chamber 7 of the barrel 1. This obturator 26 has externally the shape of a part of a sphere and it is partially hollow and with a flat bottom 27. A central hole with a chamferred inlet penetrates into the flat bottom 27 and the obturator 26 is mounted on the stem 24 by elastic catch-engagement of the slit head 25 in the hole of the bottom 27. For this purpose, the obturator is inserted in the chamber via the lower end 2 of the barrel 1 and is held to bear with its external spherical surface against the frusto-conical surface of the recess 8 which forms a valve seat for this obturator 26. Then, after positioning of the spring 23 around the bead 9, the plunger 15 is engaged with its skirt 19 around the spring 23, it is then engaged with its collar 18 in the upper end 3 of the barrel 1 and with its skirt 19 in the socket 10 by means of an axial thrust exerted on the plunger 15 and depressing the latter towards the interior of the barrel 1, against the spring 23. The stem 24 and its head 25 then penetrate into the opening 16 of the partition 5, the head 25 is then engaged in the hole of the bottom 27 of the obturator being guided by the chamferred inlet of this hole. The two halves of the head 25 are elastically compressed towards each other as the head 25 passes into the hole, then, when the head 25 emerges from the hole of the obturator 26, its two halves elastically move away from each other and block the obturator 26, so that its bottom 27 should be squeezed between the head 25' and the lower ends of the radial ribs 28 which are joined axially to the stem 24 and at their upper ends to the portion 16 of the plunger 15 so as to stiffen the stem 24. The ribs 28 have such a radial dimension that they freely extend into the spring 23 and that they pass into the opening 6. The plunger 15, together with its collar 18, its skirt 19, its stem 24 with the elastically deformable head 25 and its ribs 28, is an integral moulding of a plastic material.

The obturator 26 is also moulded of a plastic material such as synthetic rubber.

The spring 23 biases the plunger 15 towards the outside of the barrel 1 so that the obturator 26, immobilised at the end of the stem 24, is elastically applied in a leakproof manner against the frusto-conical seat 8. The axial dimension of the stem 24 is such that in this initial position of the plunger 15, the top 17 of the plunger follows the profile of the edge of the upper end 3 of the barrel 1, and the lower end of the collar 18 is lightly engaged in the annular chamber 11. The axial dimension of the skirt 19 is such that its free lower end 20 is then in contact with the internal side of the upper portion 13 of the socket 10. The chamber 29, delimited inside the skirt 19 between the plunger 15, the partition 5 and the socket 10, then communicates with the ambient atmosphere via the ribs 12, the annular chamber 22, the radial clearance between the collar 18 and the socket 10, the annular chamber 11, and the radial clearance between the collar 18 and the barrel 1 whilst the communication between the chambers 7 and 29 via the opening 6 is closed in a leakproof manner by the obturator 26 applied against its seat 8.

The sub-assembly formed by the four components described above, that is to say, the barrel 1, the plunger 15, the obturator 26, and the spring 23, and assembled as described above, then receives a charge of a relatively viscous or oily product such as a toilet lotion which is introduced into the chamber 7 of the barrel 1, up-ended so that its end 2 is directed upwards. A nose 30 is then fixed on the barrel 1. The nose 30 comprises a tubular main portion 31 and ogival in shape, and its restricted end 32 has an axial dispenser orifice 33 of a small diameter. At its opposite end to the end 32, the main portion 31 flares and is surrounded by a radially outwardly projectiing annular shoulder 34. Near this shoulder 34, the main portion 31 carries a radially outwardly projecting thread 35 with two helical half turns (see FIG. 3) and the main portion 31 of the nose 30 is finally extended beyond the shoulder 34 by a tubular circular cylindrical centering contact surface 36, which is fitted in the end 2 of the barrel 1. A peripheral groove 37 whose transverse cross-section has a trapezoidal shape corresponding to that of the cross-section of the step 4 of the barrel 1, is arranged in the external contact surface 36 at an axial distance from the shoulder 34 corresponding to the axial distance separating the step 4 from the end 2 of the barrel 1. The nose 30 is thus fixed by fitting the contact surface 36 in the barrel 1 until the shoulder 34 comes to bear against the end 2 of the barrel 1, and by elastic catch-engagement of the step 4 of the barrel 1 in the groove 37 of the contact surface 36, as shown in FIG. 1. So as to facilitate entry of the contact surface 36 into the barrel 1 and its passing beyond the step 4, the free end of the contact surface 36 has an external chamfer at 38. When it is thus fitted, the nose 30 is coaxial with the barrel 1 and this also applies to the plunger 15, its skirt 19, its collar 18 and its stem 24 in the initial position, under the effect of the thrust of the re-straining spring 23.

The nose 30 is then covered by a detachable cap 39, having the shape of a cylindrical barrel with a circular cross-section of the same internal and external diameters as the barrel 1 and closed at one end by a flat bottom 40. This flat bottom 40 carries an inwardly projecting projection 41 which comes to obturate the dispenser orifice 33 of the nose 30 in a leakproof manner, when the cap 39 is mounted and fixed on the nose 30 by screwing down the two radially inwardly projecting helical half turns 43 on the lateral wall 42 of the cap, which perform a similar function to an internal thread in the cap and which cooperate with the thread 35 of the nose until the free end 44 of this lateral wall 42 comes to bear against the shoulder 34 of the nose 30 as shown in FIG. 1.

The nose 30 and the detachable cap 39 are each also moulded integrally of a plastic material.

The dosing stylo thus obtained from only six components and charged with a product to be dispensed, is necessarily used in the position of FIG. 1, that is to say, with the nose 30 directed downwards. The cap 39 is removed by unscrewing and, although the projection 41 is withdrawn from the orifice 33, the product does not flow out from the stylo because of the small diameter of this orifice 33, the viscosity of the product and the capillarity phenomena.

To dispense a drop of the product, the plunger 15 is then depressed from its initial position shown in FIG. 1 and against the biasing spring 23. Thus the collar 18 is lowered and guided in the chamber 11, the skirt 19 slides in the socket 10 and the obturator 26 is separated from its seat 8 and is pushed back into the product chamber 7 which opens the communication between the chamber 19 and the chamber 7.

During a first portion of the travel of the plunger 15 towards the interior of the barrel 1, until the free end of the skirt 19 arrives at the lower end of the grooves 12, the chamber 29 decreases in volume without any rise of pressure in this chamber. Then, because of the leakproof contact of the skirt 19 on the internal face of the lower portion 14 of the socket 10, the decrease in volume of chamber 29 is accompanied by the pressurisation of the air contained therein and this pressure is exerted in the chamber 7 on the product located therein via the opening 6 because of the open position of the valve formed by the obturator 26 and its seat 8. The compression stroke is limited by the bottom 21 of the chamber 22 coming to bear against the upper end of the socket 10 as shown in FIG. 2. Under the effect of the air pressure exerted on the product, the latter is pushed back towards the dispenser orifice 33 of the nose 30 with the result of causing one drop of the product to emerge. When the plunger 15 is released, the spring 23 biases it towards its initial position, the obturator 26 is closed again in a leakproof manner on its seat 8 and, when the free end 20 of the skirt 19 slides in the upper portion 13 of the socket 10, the communication between the pressurisation chamber 29 and the ambient atmosphere is re-established and the chamber 29 whose volume is at present increasing, is thus recharged with fresh air which makes it possible to re-establish an air supply inside the chamber 29 with a view to a new manipulation of the plunger 15 for dispensing another drop of the product. It is clear that the quantity of the product dispensed at each manipulation of the plunger 15 is determined by the dimensions of the valve of the plunger, in particular of its skirt and the air compression stroke, and that this dispensed quantity may thus be adjusted by an appropriate dimensioning of these components and of this parameter in particular.

In order to facilitate the engagement of the projection 41 in the dispenser orifice 33 when the cap 39 is fixed on the nose 30, the cap 39 has several internal centering flanges 45 which are regularly distributed in a circumferential direction around the projection 41. These flanges 45 are, for instance, four in number, interspaced at 90° from each other. Each of them extends in a radial plane and is integral with both the flat bottom 40 and the internal face of the lateral wall 42 of the cap 39, and each flange 45, whose free internal edge has a rounded portion delimiting, together with the free internal edges of the other flanges a convergent collar for centering the cap 39 on the end 32 of the nose 30, is joined to the flat bottom 40 at a certain radial distance from the projection 41 which corresponds to the thickness of the nose 32 around the projection 41.

The variant of the embodiment which is partly shown in FIG. 4, is only distinguished from the embodiment of FIGS. 1 to 3 by the connection of the valve obturator 26' to the plunger 15'. In fact, in this variant, the central and axial stem 24', with a cruciform transverse cross-section is made of a single piece with the obturator 26' integral at its lower end with the flat bottom 27' of the obturator 26' which is, moreover, identical in its structure and operation with the obturator 26 of the example of FIGS. 1 to 3. The free or upper end portion 25' of the stem 24' has the configuration of a circular cross-section cylindrical barrel surrounded by an annular peripheral bead 46. The plunger 15' has, in its relatively thick and solid portion 16', a central cylindrically shaped recess 47 complementary to that of the upper end 25' of the stem 24' and which opens out towards the internal partition 5. A circular groove 48 of a shape complementary to that of the bead 46 is arranged in the lateral wall of the recess 47. The obturator 26' is fixed to the plunger 15' by engagement of the upper end portion 25' of the stem 24' in the recess 47 and by elastic catch-engagement of the bead 46 in the groove 48. For the rest, the structure of the plunger 15' and its cooperation with the other elements of the dosing stylo are identical with, or directly equivalent to, those of the plunger 15 of the example of FIGS. 1 to 3, but the variant of FIG. 4 has the advantage, in comparison with the example of FIGS. 1 to 3, that the assembly of the components of the upper portion of the dosing stylo is rendered easier.

The dosing stylo in accordance with the invention which, in the two variants described, is only constituted of six components of a relatively simple shape, which are inexpensive to make and easy to assemble, thus produces the same results as much more complex and expensive devices of the prior art.

However, in certain conditions of use, and following certain manipulations, a problem of dripping may arise with these variants of the dosing stylo. In fact, when the cap 39 is withdrawn from the nose 30 and when the dosing stylo is inclined so that the plunger 15 or 15' should be in the low position, air penetrates into the nose 30 via the dispenser orifice 33. When the dosing stylo is then replaced into its position of use (the nose 30 being directed downwards), a drop of an air/product mixture is obtained on the first action exerted on the plunger 15 or 15'. Then, when the plunger is again depressed, there will be an undesired formation of a drop of the product at the outlet of the dispenser orifice 33. To remedy this drawback, a seventh element also moulded integrally of a plastic material and termed a "pressure stabilizer" is fitted in the nose of the dosing stylo as shown in the variant represented in FIG. 5.

Essentially, this variant is only distinguished with reference to FIGS. 1 to 4, by the structure and the form of the nose 30', by the presence of the pressure stabilizer in this nose 30' and by the form of the projection 41' obturating the dispenser orifice 33' of the nose 30'. As in the preceding example, the nose 30' comprises at its upper end a tubular centering contact surface 36' with an internal groove 37' with which the nose 30 is fitted in the lower end 2 of the tubular barrel 1, until the elastic catch-engagement of the annular step 4 of the barrel 1 in the groove 37' occurs, and the annular and external radial shoulder 34' of the nose 30' comes to bear against the end 2 of the barrel 1. On the other hand, the main tubular portion of the nose 30' is not ogival in shape as in the preceding example but has a double frusto-conical shape. This main portion is sub-divided into three coaxial portions end to end, whereof one, 31'a, adjacent to the contact surface 36' is a cylindrical portion carrying the external thread 35' and an annular rib 49 of a triangular cross-section and projecting towards the inside at its end joined to the contact surface 36'. The second portion 31'b is frusto-conical and converges from the first portion 31'a towards the third 31'c, in the form of a frusto-conical tip whose angle of taper is clearly smaller than that of the second portion 31'b and whose small base corresponds to the end 32' of the nose 30' penetrated by the dispenser orifice 33' and having a coaxial recess in the form of an outwardly concave spherical cup. This recess accommodates a projection 41' in the form of a hemisphere with a corresponding radius and projecting inwardly from the cap 39' on the bottom 40' of the cap when the cap 39' is engaged on the nose 30' and fixed to the cap by the screwing down of threads 43' of its internal thread system on the thread 35' of the nose 30', the spherical shape of the projection 41' and the recess of the end 32' allowing the projection to be centered in the recess by swivelling, so as to obturate the dispenser orifice 33' in a leakproof manner when the cap 39' is fitted on the neck 30' without the need to provide internal centering flanges. The pressure stabilizer 50 accommodated in the nose 30' is a tubular component traversed by one product dose ejected from the product chamber of the barrel when the corresponding plunger is depressed and this tubular component is formed by two coaxial cylindrical contact surfaces 51 and 52 of different diameters joined by a coaxial frusto-conical portion 53 at the level of the small base of the portion 53, this component has a transverse partition 54 pierced by a central passage orifice 55, with a cross-section distinctly smaller than that of the dispenser orifice 33' opposite the end of nose 30'. The pressure stabilizer 50 is positioned in the nose 30' so that its contact surface 52 with the smaller diameter should be fitted in the portion adjacent to the large base of the frusto-conical tip 31c. The frusto-conical portion 53 is centered in the frusto-conical portion 31b and the contact surface 51 with the larger diameter is engaged in the cylindrical portion 31'a. The pressure stabilizer 50 is retained in this position by elastic catch-engagement of the internal rib 49 of the nose 30' behind the free end of the contact surface 51.

Figure 5:
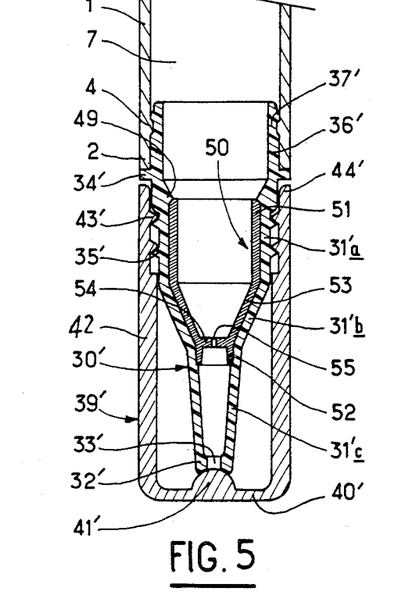
FIG. 5 is a partial axial cross-sectional view limited to the lower portion of another variant of a dosing stylo whose nose is provided with a pressure stabilizer.

When such a dispenser is first used and the plunger is released, nearly all the product which had remained in the tip 31'c between the dispenser orifice 33' and the partition 54 of the pressure stabilizer 50 is drawn towards the product chamber 7 in the barrel 1, which prevents an untimely drop formation. Moreover, it will be observed that the internal shape of the frusto-conical tip 31'c promotes the retention of the product which might possibly remain in this tip 31'c.

If the diameter of the dispenser orifice 33' of the nose 30' is for instance, 2.5 mm, an excellent functioning of the stabilizer 50 is obtained if the diameter of the passage opening 55 is 0.7 mm.

Figure 6:
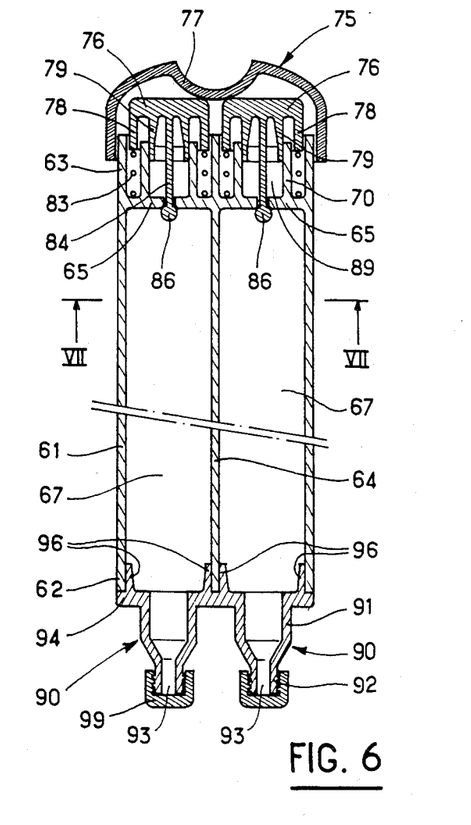
FIG. 6 is a schematic axial cross-sectional view of a preferred embodiment of the dosing stylo in accordance with the invention for the simultaneous dispensing of two products and provided with two noses.
Figure 7:
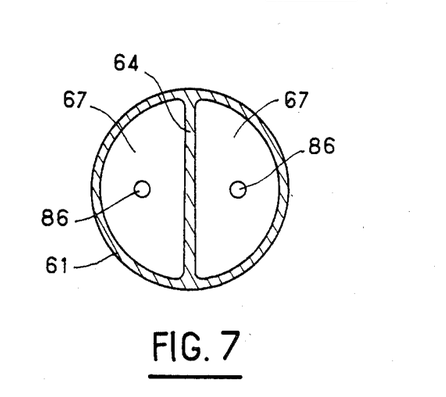
FIG. 7 is a transverse cross-sectional view along VII-VII of the dispenser barrel of FIG. 6.

The double dosing stylo or twin dispenser, schematically represented in FIG. 6, is intended to dispense simultaneously and drop by drop two different products to be mixed only at the time of their application. This dispenser comprises a tubular cylindrical barrel 61 whose internal volume is sub-divided by an internal axial partition 64 extending along a diametral plane (see FIG. 7) into two equal semi-cylindrical chambers 67, each intended to contain a charge of one of the two products to be dispensed. Inside its upper portion 63, this barrel 61 accommodates two identical mechanisms mounted symmetrically on either side of the partition 64 and of which each is functionally equivalent to and structurally very similar to the pressurising mechanism which is mounted in the upper portion of the barrel 1 of the dosing stylo shown in FIG. 1. As far as the structure is concerned, the main difference between each of the two pressurising mechanisms and that of the dispenser of FIG. 1 is that the stem 84 carrying the movable valve obturator 86, the movable skirt 79 and the lateral collar 78, are integral with a piston 76 which is not integral with the plunger 75 as in the preceding example but distinct from this plunger 75.

The plunger 75 is elastically catch-engaged at its edge having the form of a peripheral flange around the upper end 63 of the barrel 61, and its central portion 77 dished towards the inside of the barrel 61, is elastically deformable and in contact with the upper side of the two pistons 76. The latter are biased into their initial position projecting above the upper end 63 of the barrel 61 and from the internal partition 64 by two springs 83 each of which is accommodated in the annular chamber delimited in the corresponding pressurising mechanism between the upper and adjacent end 63 of the barrel 61 and the tubular socket 70 which is carried by the transverse internal partition 65 extending between the axial partition 64 and the lateral wall of the barrel 61 and which cooperates with the movable skirt 79 for pressurising air in the pressurisation chamber 89. This air is pressurised in the two chambers by the depression of the central portion of the plunger 75 towards the inside of the barrel 61 which actuates a simultaneous axial displacement of the two pistons 76 towards the partitions 65 against the springs 83 and the cooperation of each skirt 79 with the corresponding socket 70, as is the case in the example of FIG. 1 as regards the skirt 19 and the socket 10. The air pressurised in each chamber 89 passes into the corresponding product chamber 67 because the obturator 86 is separated from its seat around a corresponding pressurisation orifice arranged in the partition 65 following the depression of the pistons 76 by the plunger 75. Thus this dispenser comprises two identical juxtaposed mechanisms which are simultaneously actuated by a single plunger 75, and each of these two mechanisms functions as the pressurising mechanism in the upper portion of the dispenser of FIG. 1. The twin dispenser of FIG. 6 comprises two identical noses 90 each of which communicates with only one of the product chambers 67. Each nose 90 comprises one main cylindrical portion 91 tapering via a frusto-conical portion as far as its cylindrical end 92, which surrounds the dispenser orifice 93 and which has an external thread, and this orifice 93 is obturated by screwing down a stoppering cap 99 on the end 92. The sight of two caps 99 and two noses 90 allows the user to understand immediately that the dispenser is designed for two products. The two noses 90 are moulded from a single piece of a plastic material in the form of an end fitting having an external radial stop shoulder 94 against the lower end 62 of the barrel 61 and two axial lips 96, which are fitted in the lower end 62 of the barrel 61 by gripping the lower end of the wall 64 between them.

In such a dispenser, the central dished portion 77 of the plunger 75 facilitates the positioning of the user's finger for pressing on the plunger 75 and simultaneously lowering the two pistons 76 in order to produce the simultaneous emergence of one drop of each of the two products via the noses 90.

Figure 8:
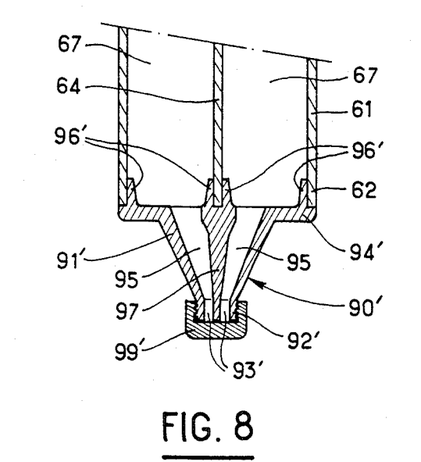
FIG. 8 is a partial axial cross-sectional view limited to the lower portion of a variant of the dosing stylo for two products provided with a single nose.

In FIG. 8, the lower portion of a variant of a two product dispenser has been shown whose barrel 61 and pressurising mechanisms of the upper portion are identical with the corresponding elements of FIG. 6. The main difference is that the dispenser of FIG. 8 comprises a single nose 90'. The latter is mounted on the barrel 61 as in the preceding example by fitting the two lips 96' of the nose 90' in the lower end 62 of the barrel and by gripping the wall 64 between these lips 96', the external peripheral shoulder 94' of the nose 90' abutting the lower end 62 of the barrel 61. This nose 90' comprises a frusto-conical central portion 91' converging towards the end 92' of the nose and whose internal volume is sub-divided into two independent ducts 95 by a median wall 97 extending from one end of nose 90' to the other in such a way that each of the two ducts 95 has a cross-section decreasing from its inlet in communication with the corresponding product chamber 67, forming at its outlet one of two adjacent dispenser orifices 93' in the end 92' of the nose. The two dispenser orifices 93' may be simultaneously stoppered by a single cap 99' which is screwed on to an external thread of the end 92'.

This embodiment has the advantage that the drops of the two products dispensed simultaneously are immediately adjacent which facilitate their mixing immediately after application.

Of course, it is indicated, though this has not been shown in the Figures, that a pressure stabilizer, similar to the stabilizer 50 of FIG. 5, can be mounted in each of the noses of the dispenser of FIG. 6 as well as in each of the ducts 95 of the nose 90' of the dispenser of FIG. 8.

Subject to the traverse size of the dispenser remaining acceptable, three or even four pressurising mechanisms similar to that of FIG. 1 may be mounted in one and the same barrel, side by side, each one being associated with a product chamber delimited within the barrel and which communicates with a dispenser orifice at the end of the neck.

It shall be duly understood that the devices described above may give rise to any desirable modifications without thereby departing from the scope of the invention.

I claim:

1. In a device for dispensing at least one relatively viscous product in dosed quantities, comprising:
   (a) a tubular barrel defining at least one product chamber intended to contain a charge of a product to be dispensed;
   (b) at least one nose as an extension of a first end of the barrel;
   (c) means defining at least one small diameter dispenser orifice at the end of said at least one nose;
   (d) a detachable cap capable of obturating said dispenser orifice in a leakproof manner by fixing on the corresponding said nose;
   (e) at least one pressurising means in said barrel;
   (f) a plunger accessible from outside the barrel for actuating said pressurising means, said pressurising means being effective to cause a quantity of pressurised air to penetrate into said product chamber in order to eject a dosed quantity of the corresponding product via a corresponding said dispenser orifice when the stopper is withdrawn and when the plunger is depressed towards the interior of barrel from an initial position;

(g) at least one biasing spring tending to push back the plunger towards the outside of the barrel into its initial position and to allow the pressurising means to close said product chamber in a leakproof manner at the second end of the barrel;

the improvement wherein, for each product, the pressurising means form an assembly comprising:

(h) a valve having a movable obturator and a piston accompanying the plunger in its displacement and connected to said movable obturator, a valve seat to engage said movable obturator in a leakproof manner, and means defining a pressurisation orifice surrounded by said valve seat, said pressurisation orifice being formed by an internal partition of the barrel and said valve obturator being separated from its seat when the plunger is depressed towards the interior of the barrel; and (i) a movable skirt joined to said piston accompanying the plunger in its displacements and delimiting with a tubular portion of the barrel, a variable volume pressurisation chamber, said pressurisation chamber having a maximum volume and being in communication with the ambient atmosphere when the plunger occupies its initial position where said skirt is out of contact with said tubular portion and said pressurisation chamber decreasing in volume and being isolated from the ambient atmosphere when the skirt comes into sliding and leakproof contact on the tubular portion of the barrel when the plunger is depressed towards the inside of the barrel whereby the air compressed in said pressurisation chamber flows into the corresponding product chamber by passing through the pressurisation orifice.

2. A dispenser device according to claim 1, including a pressure stabilizer mounted in said nose for said dispenser orifice, said pressure stabilizer comprising a tubular component having internal passage means intended to be traversed by a dosed quantity of the product ejected from the product chamber towards the dispenser orifice, said internal passage means being partly obturated by a transverse partition penetrated by means defining a passage opening with a smaller cross-section than the corresponding dispenser orifice.

3. A dispenser device according to claim 2, intended for the dispensing of a single product, said dispenser device having said barrel delimiting a single product chamber and being extended in a single nose whose end has a single dispenser orifice, wherein the plunger simultaneously constitutes the piston of the pressurising means, wherein the tubular component of the pressure stabilizer presents two cylindrical contact surfaces of different diameters, joined by a frusto-conical portion whose small base is formed by the transverse partition with the passage opening, wherein the smaller diameter cylindrical contact surface is fitted in a portion adjacent to the large base of a substantially frusto-conical tip of the nose whose end is formed by the portion adjacent the small base of said tip, and wherein the said tubular component of the pressure stabilizer is retained in position by elastic catch-engagement of its larger diameter cylindrical bearing surface with the nose.

4. A dispenser device according to claim 1, wherein a plurality of sets of pressurizing means are provided and for each set of pressurizing means, a stem fixedly connects the corresponding obturator with the corresponding piston, said stem extending inside the barrel.

5. A dispenser device according to claim 4, wherein said obturator is fixed to the corresponding piston by elastic catch-engagement.

6. A dispenser device according to claim 5, wherein said stem is integral with the corresponding piston and carries at its free end, an largled and elastically deformable head which comes to be elastically catch-engaged in a hole arranged in the corresponding obturator.

7. A dispenser device according to claim 5, wherein said piston includes recess means with groove means formed therein, and wherein said stem is integral with the obturator and is surrounded in its free end portion by at least one peripheral bead with which the stem is elastically catch-engaged in said groove means formed in the lateral wall of said recess means in the piston, and wherein the free end portion of the stem is engaged in said recess means.

8. A dispenser device according to claim 1, for the simultaneous dispensing of two products, wherein the tubular barrel has an internal and axial partition which delimits in the barrel two adjacent product chambers, separated from each other, each of which is intended to contain one charge of one of the two products to be dispensed, wherein the barrel also contains two sets of pressurising means which are symmetrical in relation to the said internal partition, the plunger being mounted in the barrel so as to push the two pistons of these sets of the pressurising means simultaneously against the biasing springs for each of the pistons when the plunger is depressed towards the inside of the barrel.

9. A dispenser device according to claim 8, wherein each of the biasing springs is accommodated between the barrel and the tubular portion of the barrel.

10. A dispenser device according to claim 8, wherein the barrel is extended in a single nose traversed by two ducts separated from each other and each leading to one of two adjacent dispenser orifices in the end of the nose, there being a single obturating cap for the two dispenser orifices which is screwed on the nose by complementary threads on the nose and cap, the nose comprising a single end fitting with which it is fitted in the barrel so that each of the two ducts of the nose only communicates with one of the two product chambers delimited in the barrel.

11. A dispenser device according to claim 8, wherein the barrel has two noses each of which has a single dispenser orifice and is integral with a common end fitting fitted in the barrel so that each dispenser orifice can only dispense the product ejected from one of the two product chambers; and wherein a stopper obturating each dispenser orifice is formed by the bottom of said cap which is screwed down onto the end of the corresponding nose by complementary threads on each of the cap and nose.

12. A dispenser device according to claim 1, wherein each skirt has a substantially frusto-conical shape and has a first end fixed to the corresponding piston and a second end free and slidable along the corresponding tubular portion which has two guide portions disposed end to end, one of said guide portions having a larger transverse cross-section than the other so that the free end of the skirt does not slide in a leakproof manner along one of the portions, over a first part of the compression stroke of the plunger as it is depressed towards the inside of barrel from its initial position, whilst the free end of the skirt does slide in a leakproof manner along the other portion over the rest of the compression stroke of the plunger.

13. A dispenser device according to claim 12, wherein said skirt is integral with the corresponding piston.

14. A dispenser device according to claim 12, wherein said skirt flares towards its free end and slides within the tubular portion which constitutes a socket inside the barrel said socket being carried by the internal partition and having its guide portion with the smaller transverse cross-section adjacent to this partition.

15. A dispenser device according to claim 14, wherein the larger transverse cross-section portion is delimited on said socket by groove means arranged on the internal side of the corresponding socket and extending only over a part of the length of the said socket.

16. A dispenser device according to claim 14, wherein said biasing spring has a first end bearing against the internal partition and is centered at said first end around a bead surrounding the pressurisation orifice, said bead projecting inwardly of the pressurisation chamber and being carried by the internal partition.

17. A dispenser device according to claim 14, wherein said piston comprises a lateral collar surrounding the skirt with a gap, and delimiting with said skirt an annular chamber with a closed bottom in which the corresponding socket is accommodated when the plunger and the piston are depressed towards the inside of the barrel, said closed bottom coming to bear against the socket to limit the compression stroke of the piston, said lateral collar is itself guided in another annular chamber inside the barrel and around the outside of the internal socket.

18. A dispenser device according to claim 17, wherein said internal partition is substantially perpendicular to the longitudinal axis of the tubular barrel; wherein, for said pressurising means, the corresponding piston, obturator and skirt are axially displaced in the barrel; and wherein the skirt and the pressurisation orifice, the obturator and the seat of the valve, the stem and the said lateral collar of the corresponding piston and the said bead of the corresponding partition are coaxial.

19. A dispenser device according to claim 1, intended for the dispensing of a single product, said dispenser device having said barrel delimiting a single product chamber and being extended in a single nose whose end has a single dispesner orifice, wherein the plunger simultaneously constitutes the piston of the pressurizing means.

20. A dispenser device according to claim 19, wherein the stopper intended to obturate the dispenser orifice of the nose is formed by the bottom of a detachable cap intended to cover the nose.

21. A dispenser device according to claim 19, wherein said biasing spring has a first end bearing against the internal partition and is centered at said first end around a bead surrounding the corresponding pressurization orifice, said bead projecting inwardly into the corresponding pressurisation chamber and being carried by the corrsponding internal partition, and wherein the centering bead for the end of the biasing spring which bears against the internal partition is situated the pressurisation orifice.

22. A dispenser device according to claim 19, wherein the skirt is integral with the corresponding piston and is jointed to the plunger via a shoulder of the plunger on which the single biasing spring bears and is centered at one of its ends.

23. A dispenser device according to claim 19, wherein the tubular barrel has, near its first end, an inwardly projecting peripheral step elastically catch-engaging in a peripheral groove arranged in the external face of a cylindrical tubular centering contact surface provided at one end of the nose, wherein said nose is fitted in the first end of the tubular barrel by means of the said centering contact surface, and wherein the first end of the barrel bears against an external peripheral shoulder of the nose.

24. A dispenser device according to claim 23, wherein the detachable cap has on its bottom a projection pointing towards the inside of the cap, said projection penetrating at least partly into the end of the nose so as to obturate the dispenser orifice in a leakproof manner when the cap is engaged and fixed on the nose by screwing down the cap on the nose until the cap abuts the external peripheral shoulder of the nose by means of complementary threads on the cap and nose.

25. A dispenser device according to claim 24, wherein the cap carries several internal radial flanges distributed around, and interspaced from the projection, on the bottom of the cap, so as to centre the cap on the end of the nose and to guide the projection in obturating position of the dispenser orifice, when the cap is fixed on the nose.

* * * * *